United States Patent [19]

Marshall et al.

[11] 4,239,648
[45] Dec. 16, 1980

[54] TELOMERIC PHOSPHORUS CORROSION INHIBITING COMPOSITIONS

[75] Inventors: Alan Marshall, Macclesfield; Norman Richardson, Middleton, both of England

[73] Assignee: Ciba-Geigy Corporation, Ardsley, N.Y.

[21] Appl. No.: 57,155

[22] Filed: Jul. 12, 1979

[30] Foreign Application Priority Data

Jul. 19, 1978 [GB] United Kingdom ............ 30419/78

[51] Int. Cl.³ .................... C23F 11/16; C23F 11/18
[52] U.S. Cl. .................... 252/389 A; 106/14.12; 210/749; 422/15
[58] Field of Search ............ 252/389 A, 389 R; 422/15; 106/14.12; 210/59, 60

[56] References Cited

U.S. PATENT DOCUMENTS

| | | | |
|---|---|---|---|
| 2,957,931 | 10/1960 | Hamilton et al. | 260/403 |
| 4,042,324 | 8/1977 | Auel et al. | 422/15 |
| 4,057,511 | 11/1977 | Bohnsack et al. | 422/15 |

FOREIGN PATENT DOCUMENTS 1458235 12/1976 United Kingdom .

Primary Examiner—Benjamin R. Padgett
Assistant Examiner—Irwin Gluck
Attorney, Agent, or Firm—Luther A. R. Hall

[57] ABSTRACT

Compositions useful for inhibiting the corrosion of ferrous metals in contact with aqueous systems comprise (a) a telomeric compound of formula:

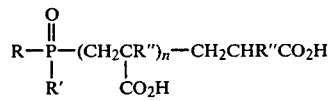

or salts thereof, wherein $R^{11}$ is hydrogen or a methyl or ethyl residue; R is hydrogen, a straight- or branched alkyl residue having from 1-18 carbon atoms, a cycloalkyl residue having from 5-12 carbon atoms, an aryl residue, an aralkyl residue, a residue of formula:

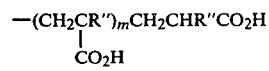

wherein $R^{11}$ has its previous significance; and the sum of $n+m$ is an integer of at most 100; or a residue —OX wherein X is hydrogen or a straight- or branched alkyl residue having 1-4 carbon atoms and $R^1$ is a residue —OX, wherein X has its previous significance.

18 Claims, 3 Drawing Figures

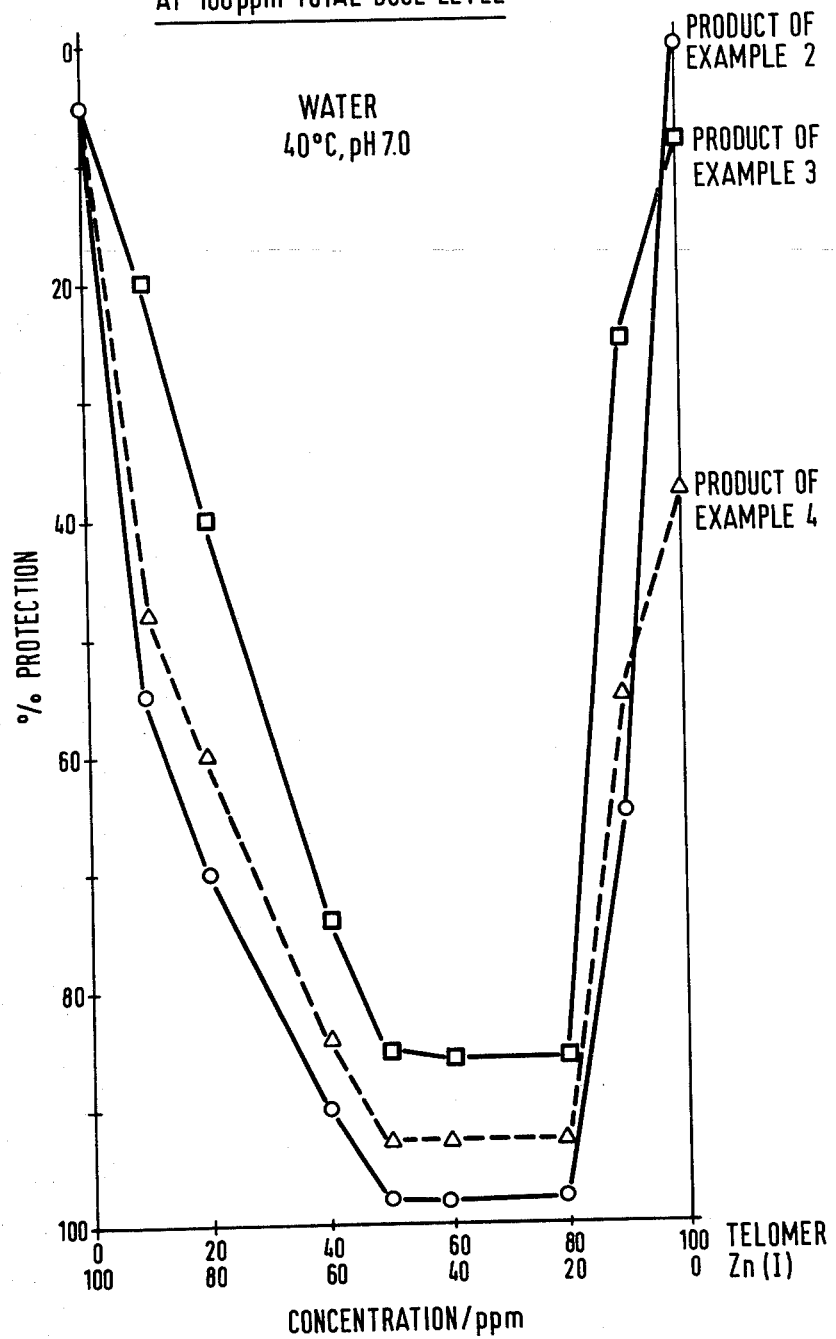

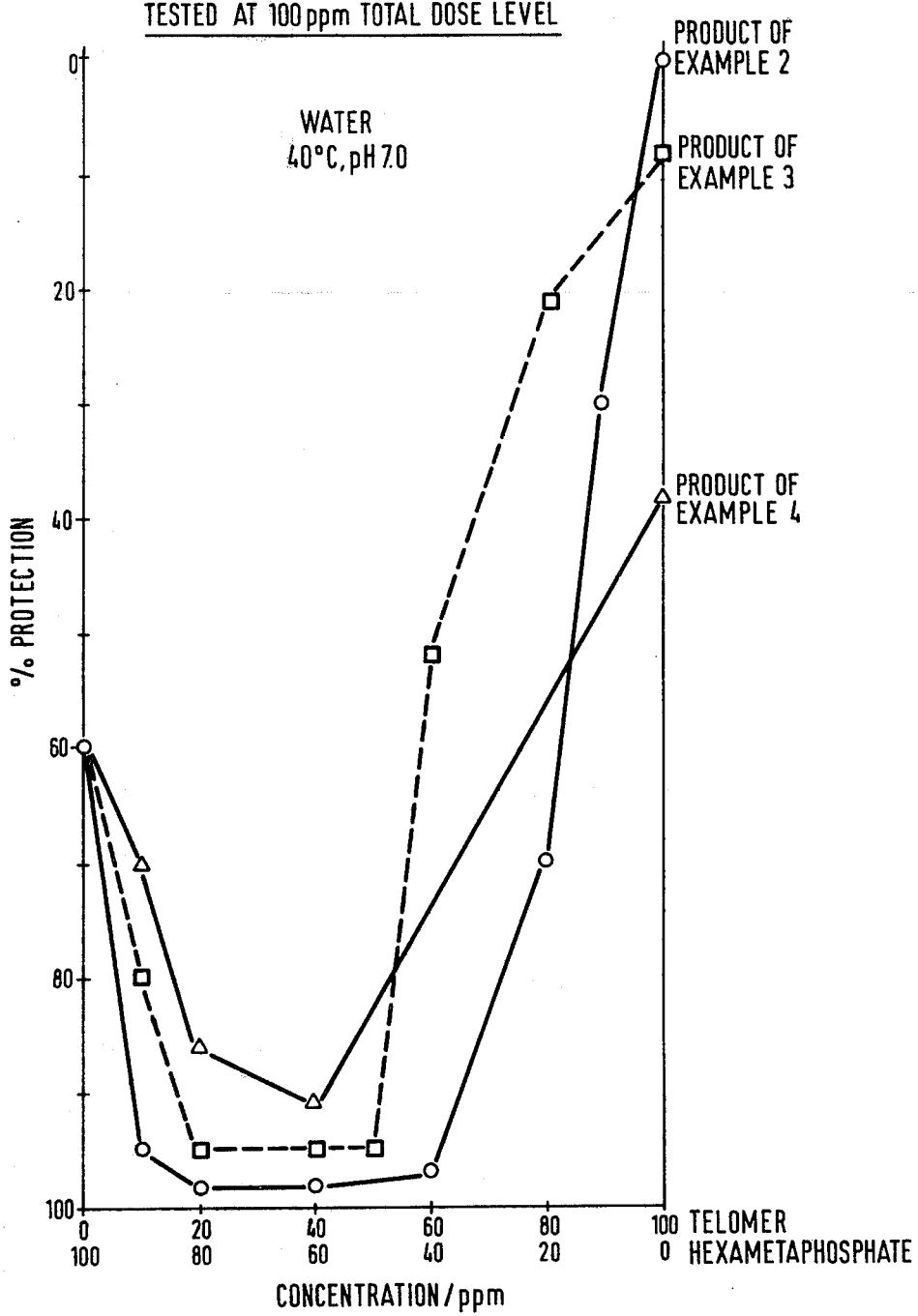

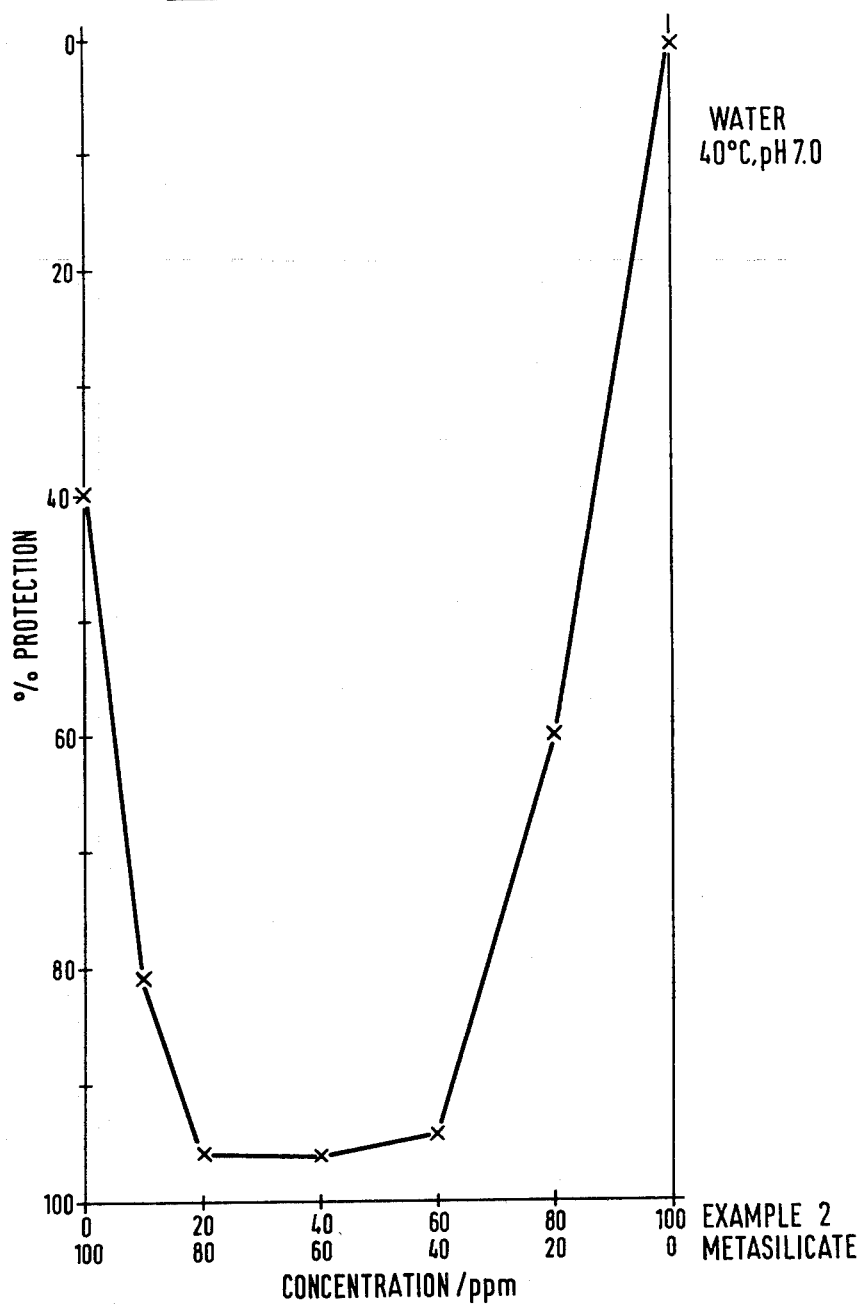

TELOMERIC PHOSPHORUS CORROSION INHIBITING COMPOSITIONS

The present invention relates to a new chemical composition, in particular a new corrosion inhibitor composition and its use in treating an aqueous system in contact with ferrous metals.

In our British Patent Specification No. 1,458,235, there is described and claimed a method of inhibiting the precipitation of the scale forming salts of calcium, magnesium, barium and strontium from aqueous systems over a wide temperature range, comprising adding to the aqueous system a minor proportion of a product comprising a telomeric compound of the formula:

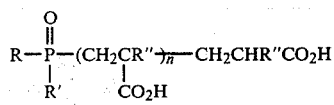   I and salts thereof, wherein R″ is hydrogen or a methyl or ethyl residue, R is hydrogen, a straight- or branched alkyl residue, having from 1 to 18 carbon atoms, a cycloalkyl residue having from 5 to 12 carbon atoms, an aryl residue, an aralkyl residue, a residue of formula:

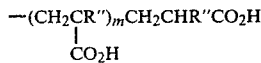

wherein R″ has its previous significance and the sum n+m is zero or an integer of at the most 100, or a residue-OX wherein X is hydrogen or a straight- or branched alkyl residue having from 1 to 4 carbon atoms and R′ is a residue-OX wherein X has its previous significance. This Specification also suggests that the compounds of formula I may be used together with a corrosion inhibitor viz.cyclohexylamine, morpholine, distearylamine/ethylene oxide condensates or stearylamine.

We have now found that compositions comprising telomers of formula I and certain specific corrosion inhibitors are excellent synergistic corrosion inhibitors for ferrous metals in contact with aqueous systems.

Accordingly, the present invention provides a composition, useful for inhibiting the corrosion of ferrous metals in contact with aqueous systems, comprising (a) a telomeric compound of formula I as hereinbefore defined, or a salt thereof; and (b) one or more compounds selected from
 (i) a zinc salt
 (ii) a polyphosphate
 (iii) a silicate and/or
 (iv) a molybdate Salts of the telomeric compounds of formula I are compounds in which some or all of the acidic hydrogens in the acidic compounds of formula I have been replaced by alkali metal—or alkaline earth metal ions, ammonium ions or quaternised amine radicals.

These salts also are effective in inhibiting the corrosion of metals in contact with the water system, e.g. recirculating water cooling systems and hydrostatic steriliser systems.

Preferably R″ is hydrogen and it is preferred that the sum of m and n is zero or an integer up to 60.

Preferred examples of substituents R include hydrogen, or a residue of formula:

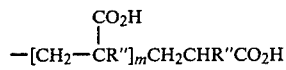

wherein R″ and m have their previous significance.

Particularly preferred compounds of formula I are those wherein R is hydrogen or a residue of formula:

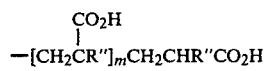

wherein $R^1$ is OX wherein X is hydrogen or a water-solubilising cation, R″ is hydrogen and m and n are each zero or, more preferably, an integer up to 30.

Examples of the bases with which compounds of formula I may be reacted in order to form partial or complete salts are the hydroxides and carbonates of sodium, potassium and ammonium. Similarly organic bases may be employed. For instance primary, secondary and tertiary alkyl and substituted alkyl amines in which the total carbon number does not exceed twelve, such as triethanolamine.

The compounds of formula I are not new; the compounds and their process of manufacture are described in U.S. Pat. No. 2,957,931.

Thus the compounds of formula I may be prepared in a convenient manner by reacting various molar ratios of a compound of formula:

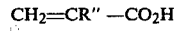   II wherein R″ has its previous significance, with a compound of formula:

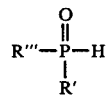   III wherein R′ has its previous significance and R‴ is hydrogen, a straight or branched chain alkyl residue having from 1 to 18 carbon atoms, a cycloalkyl residue having from 5 to 12 carbon atoms, an aryl, an aralkyl residue or OX wherein X has its previous significance.

Alternatively a salt of the compound of formula III may be employed in which the acidic hydrogens have been partially or completely replaced by cations derived from the salt forming bases hereinbefore described.

The reaction is carried out in a solvent inert under the reaction conditions and in the presence of a reaction initiator. The reaction temperatures used may be e.g. from 65° C. to 100° C., preferably from 75° to 100° C. Suitable reaction solvents are for instance, water, aqueous ethanol or dioxan. Suitable reaction initiators are those materials which decompose under the reaction conditions to yield free radicals. Examples of such materials are azobisisobutyronitrile, organic peroxides such as benzoyl peroxide, methyl ethyl ketone peroxide, ditertiary butyl peroxide and monobutyl hydroperoxide, and oxidising agents such as hydrogen peroxide, sodium perborate and sodium persulphate.

The products of this process are obtained as solutions. These may be subjected to partial or complete evaporation under reduced pressure. The unpurified reaction products may be used as the telomeric products in the method of the invention. The reaction products may also be purified. The purification procedure may be:

(i) by evaporation of reaction solvent, dissolving the residue in water, washing with a water immiscible organic solvent e.g. ether and evaporation of the aqueous solution (ii) by evaporation of reaction solvent, dissolving the residue in e.g. methanol, filtration and reprecipitation e.g. by addition of ether.

Salts of the compounds of formula I in which some or all of the acidic hydrogens in the compounds of formula I have been replaced by the cations derived from the salt forming bases hereinbefore defined, may be prepared by mixing an aqueous or alcoholic solution of the compound of formula I with an aqueous or alcoholic solution containing an amount of the requisite base in excess of, equal to or less than the stoichiometric requirement. The solvent may then be removed by evaporation. In many of the water-containing systems where inhibitors of this invention would prove useful, the water is sufficiently alkaline to effect neutralisation and only the product of the invention need be added.

The precise composition of the products of this preparative process has not been fully defined. Nuclear magnetic resonance examination has shown, however, that in addition to unreacted compounds of formula III and polymerised compounds derived from formula II, the reaction product of the process hereinbefore described contains as major components compounds of the formula I as hereinbefore defined.

When a zinc salt is used as part or the whole of component (b) of the composition of the invention, it may be any of the water-soluble salts of zinc e.g. zinc borate, chloride, nitrate or sulphate. Likewise, the polyphosphate, silicate and molybdate components of the compositions of the present invention may be any water-soluble polyphosphate, silicate and molybdate e.g. the alkali metal, especially the sodium and potassium metal salts. The amount of the corrosion-inhibiting composition added to the aqueous system is preferably from 0.1 to 500 ppm, more preferably from 1 to 200 ppm.

The ratio of (a) the compound of formula I to (b) the zinc and/or polyphosphate and/or silicate and/or molybdate is preferably from 10 to 99% of compound of formula I to 90 to 1% of zinc and/or polyphosphate and/or silicate and/or molybdate. In a first preferred instance wherein zinc is used as sole component (b), preferred ratios are 40 to 85%, preferably 80% of compound of formula I to 60 to 15% preferably 20% of zinc salt.

When, in a second preferred instance, polyphosphate is used as sole component (b), preferred ratios are 10 to 70%, preferably 40% of compound of formula I to 90 to 30%, preferably 60% of polyphosphate.

FIGS. 1–3 show the effects of combining formula I with zinc, sodium hexametaphosphate and sodium metasilicate.

The composition of the present invention may contain further dispersing and/or threshold agents and/or antifoaming agents such as for example polymerised acrylic acid and its salts, hydrolysed polyacrylonitrile, polymerised methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, and cellulose. Specific threshold agents such as for example, hydrolysed polymaleic anhydride and its salts, alkyl phosphonic acids, 1-aminoalkyl-1,1-diphosphonic acids and their salts and alkali metal phosphates, may also be used; antifoaming agents which may be used include distearyl sebacamide, distearyl adipamide and related products derived from ethylene oxide condensations, in addition to fatty alcohols, such as capryl alcohols and their ethylene oxide condensates, and ethylene oxide/propylene oxide copolymers.

The present invention also provides a method of inhibiting the corrosion of ferrous metals in contact with an aqueous system comprising adding to the aqueous system, a minor proportion of the composition of the present invention, as hereinbefore defined. The amount by weight of the active corrosion-inhibiting composition added to the aqueous system is preferably from 0.1 to 500 ppm, more preferably from 1 to 200 ppm.

The following Examples further illustrate the present invention. Examples 1 to 5 describe the production of various products containing compounds of formula I, the use of which, as corrosion inhibitors, is shown in Examples 6 to 13.

EXAMPLE 1

Reaction of acrylic acid and sodium hypophosphite in a 2:1 molar ratio

To a solution of 44 g (0.5 mole) sodium hypophosphite in 100 g water at 75° C. is added a solution of 14.4 g sodium persulphate in 100 g of water dropwise over a period of 2.5 hours. 5 minutes after the start of this addition the addition of 72 g (1 mole) acrylic acid is commenced, the acrylic acid being added over a period of 2 hours. On the completion of the additions, the reaction mixture is heated to 85° C. and maintained thus for a period of 2 hours.

There is obtained an aqueous solution having a solids content of 25.2%.

A sample of the telomer was isolated by evaporating 100 g of the solution to dryness. The residue was treated with 200 mls. hot methanol. The solution was filtered to remove unreacted sodium hypophosphite and sodium persulphate decomposition products. The filtrate was concentrated to a volume of 100 mls and the telomer precipitated by the addition of 1 liter diethyl ether. The telomer of formula I so obtained after drying under vacuum at 50° C. had a phosphorus content of 12.7% and molecular weight of 440, determined by osmometry in water.

EXAMPLE 2

Reaction of acrylic acid and sodium hypophosphite in a 4:1 molar ratio

The telomer was prepared by the method described above excepting that 144 g (2.0 moles) acrylic acid was used instead of 72 g.

The telomer of formula I isolated as described in Example 1 had a phosphorus content of 8.0% and a molecular weight of 665 determined by osmometry in water.

EXAMPLE 3

Reaction of acrylic acid and sodium hypophosphite in a 6:1 molar ratio

The telomer was prepared by the method described above in Example 1 excepting that 216 g (3.0 moles) of acrylic acid were used instead of 72 g. and the amount of sodium persulphate was increased from 14.4 g. to 21.6 g. The telomer of formula I isolated as in Example 1 had a phosphorus content of 5.2% and molecular weight of 696, determined by osmometry in water.

EXAMPLE 4

Reaction of acrylic acid and sodium hypophosphite in a 8:1 molar ratio

The telomer of formula I was prepared by the method described above in Example 1, excepting that 288 g (4.0 moles) acrylic acid were used instead of 72 g. and that the amount of sodium persulphate was increased to 28.8 g. from 14.4 g.

The telomer isolated as in Example 1 had a phosphorus content of 4.9% and molecular weight of 750, determined by osmometry in water.

EXAMPLE 5

Reaction of acrylic acid and sodium hypophosphite in a 16:1 molar ratio

The telomer was prepared by the method described above in Example 1 excepting that 576 g (8.0 moles) acrylic acid were used instead of 72 g. and that the amount of sodium persulphate was increased to 56.4 g. from 14.4 g.

The telomer of formula I had a phosphorus content of 2.0% and molecular weight of 1,130, determined by osmometry in water.

EXAMPLES 6 to 13

Demonstration of Corrosion Inhibitor Activity of Product of Examples 1 to 5

Corrosion inhibitor activity of the product of each of Examples 1 to 5 was demonstrated in the following way by the Aerated Solution Bottle Test and using a standard corrosive water made up as follows:
20 g. $CaSO_4 2H_2O$
15 g. $MgSO_4 7H_2O$
4.6 g. $NaHCO_3$
7.7 g. $CaCl_2 6H_2O$
45 gallons Distilled water Mild steel coupons, 5 cms × 1.5 cms are scrubbed with pumice, immersed for one minute in hydrochloric acid and then rinsed, dried and weighed.

The desired proportion of additive combination is dissolved in 100 ml. of standard corrosive water. A steel coupon is suspended in the solution, and the whole is stored in a bottle in a thermostat at 40° C. During the storage period, air is passed into the solution at 500 ml/minute, the passage of the air being screened from the steel coupon; any water losses by evaporation are replaced as they occur with distilled water from a constant head apparatus.

After 48 hours, the steel coupon is removed, scrubbed with pumice, immersed for one minute in hydrochloric acid inhibited with 1% by weight of hexamine and then rinsed, dried and reweighed. A certain loss in weight will have occurred. A blank test i.e. immersion of a mild steel specimen in the test water in the absence of any potential corrosion inhibitor, is carried out with each series of tests. The corrosion rates are calculated in milligrams of weight loss/sq. decimeter/day (m.d.d.) but for convenience the results are shown as percentage protection, which is defined as follows:

% Protection =

-continued
$$\frac{\text{Corrosion rate for blank (in mdd)} - \text{corrosion rate for sample (in mdd)}}{\text{Corrosion rate for blank (in mdd)}} \times 100$$

The results obtained using (a) 100 parts per million of the product of Examples 1–5 alone, (b) 50 parts per million of the product of Examples 1–5 and 50 parts per million of polyphosphate, (c) 50 parts per million of the product of Examples 1–5 and 50 parts per million of a water-soluble zinc salt, (d) 50 parts per million of the product of Example 2 and 50 parts per million of metal-silicate, and (e) 50 parts per million of the product of Example 2 and 50 parts per million of molybdate, are shown in Table I.

TABLE I

| | | % Protection | | | | |
|---|---|---|---|---|---|---|
| Example | Product from | 100 ppm alone | 50 ppm additive + 50 ppm $Zn_n^{II}$ | 50 ppm additive + 50 ppm polyphosphate | 50 ppm additive + 50 ppm metasilicate | 50 ppm additive + 50 ppm molybdate |
| 6 | Example 1 | 15 | — | 95 | — | — |
| 7 | Example 2 | 38 | 98 | 98 | 96 | 98 |
| 8 | Example 3 | 40 | 85 | 93 | — | — |
| 9 | Example 4 | 38 | 93 | 91 | — | — |
| 10 | Example 5 | 43 | 88 | 92 | — | — |

Similar results were obtained using the products of Examples A to K British Patent Specification No. 1,458,235.

EXAMPLE 11

The results obtained in the Aerated Solution Bottle Test using from 0–100 ppm of the products from Examples 2–4 in mixtures with 100–0 ppm of a water soluble zinc salt are shown in FIG. 1.

EXAMPLE 12

The results obtained in the Aerated Solution Bottle Test using from 0–100 ppm of the products from Examples 2–4 in mixtures with 100–0 ppm of sodium hexametaphosphate are shown in FIG. 2.

EXAMPLE 13

The results obtained in the Aerated Solution Bottle Test using from 0–100 ppm of the product of Example 2 in mixtures with 100–0 ppm of sodium metasilicate are shown in FIG. 3.

The results from Examples 11–13 clearly show the synergism obtained when products of formula I are combined with the specified materials.

What we claim is:

1. A composition for inhibiting the corrosion of ferrous metal in contact with aqueous systems comprising
(a) a product comprising a telomeric compound of the formula:

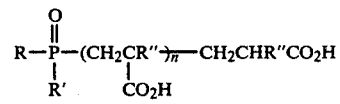

and salts thereof, wherein R" is hydrogen or a methyl or ethyl residue, R is hydrogen, a straight- or branched alkyl residue, having from 1 to 18 carbon atoms, a cycloalkyl residue having from 5 to 12 carbon atoms, an aryl residue, an aralkyl residue, a residue of formula:

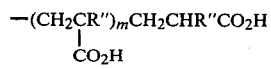

wherein R" has its previous significance and the sum n+m is zero or an integer of at the most 100, or a residue—OX wherein X is hydrogen or a straight- or branched alkyl residue having from 1 to 4 carbon atoms and R' is a residue—OX wherein X has its previous significance; or a salt thereof; and (b) one or more compounds selected from:
  (i) a zinc salt
  (ii) a polyphosphate
  (iii) a silicate and/or
  (iv) a molybdate.

2. A composition as claimed in claim 1 wherein R" is hydrogen and the sum of m and n is zero or an integer up to 60.

3. A composition as claimed in claim 1 or 2 wherein R is hydrogen or a residue of formula:

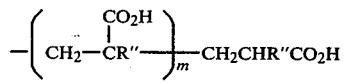

wherein R" and m are as defined in claim 1.

4. A composition as claimed in claim 3 wherein R is hydrogen or a residue of formula:

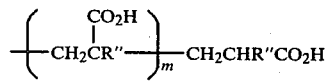

wherein R" is hydrogen and m is zero or an integer of up to 30; R' is OX wherein X is hydrogen or a water-solubilizing cation; and n is zero or an integer up to 30.

5. A composition as claimed in claim 1 wherein component (b) is a water-soluble zinc salt.

6. A composition as claimed in claim 5 wherein the zinc salt is zinc borate, zinc chloride, zinc nitrate or zinc sulphate.

7. A composition as claimed in claim 1 wherein component (b) is a water-soluble polyphosphate, silicate or molybdate.

8. A composition as claimed in claim 7 wherein the water soluble salt is an alkali metal salt.

9. A composition as claimed in claim 8 wherein the alkali metal salt is a sodium or potassium salt.

10. A composition as claimed in claim 1 wherein the ratio of component (a) to component (b) is from 10–99% to 90 to 1%.

11. A composition as claimed in claim 10 wherein a zinc salt is the sole component (b) and the ratio of component (a) to component (b) is 40–85% to 60–15%.

12. A composition as claimed in claim 11 wherein the ratio of component (a) to component (b) is 80% to 20%.

13. A composition as claimed in claim 10 wherein a polyphosphate is used as sole component (b) and the ratio of component (a) to component (b) is 10 to 70% to 90 to 30%.

14. A composition as claimed in claim 13 wherein the ratio of component (a) to component (b) is 40% to 60%.

15. A composition as claimed in claim 1 wherein a further dispersing agent/or threshold agent and/or antifoaming agent is present.

16. A method of inhibiting the corrosion of ferrous metals in contact with an aqueous system comprising adding to the aqueous system a minor proportion of a composition as claimed in claim 1.

17. A method as claimed in claim 16 wherein the amount of the corrosion-inhibiting composition added is from 0.1 to 500 ppm.

18. A method as claimed in claim 17 wherein the amount of the corrosion-inhibiting composition added is from 1 to 200 ppm.

* * * * *